United States Patent
Knosp et al.

(10) Patent No.: US 6,472,102 B2
(45) Date of Patent: Oct. 29, 2002

(54) HYDRIDABLE ALLOY

(75) Inventors: Bernard Knosp, La Garenne Colombes (FR); Olivier Arnaud, Bordeaux (FR); Thierry Hezeque, St Andre de Cubzac (FR); Paul Barbic, St Veit/Glan (AT); Alexander Bouvier, Krumpendorf Am Wörthersee (AT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/920,120

(22) Filed: Aug. 3, 2001

(65) Prior Publication Data

US 2002/0037453 A1 Mar. 28, 2002

(30) Foreign Application Priority Data

Aug. 10, 2000 (FR) .............................. 00 10526

(51) Int. Cl.$^7$ .............................. H01M 4/38; C01B 6/24
(52) U.S. Cl. ..................... 429/218.2; 420/900
(58) Field of Search ................. 429/218.2; 420/900

(56) References Cited

U.S. PATENT DOCUMENTS

| 5,512,385 A | 4/1996 | Komori et al. |
| 5,753,386 A | 5/1998 | Inaba et al. |
| 6,106,768 A | * 8/2000 | Lee et al. ................. 420/580 |

FOREIGN PATENT DOCUMENTS

| EP | 0 271 043 A1 | 6/1988 |
| JP | 7-268519 | 10/1995 |
| JP | 9-31573 | 2/1997 |
| JP | 10-152739 | 6/1998 |
| JP | 11-25964 | 1/1999 |

* cited by examiner

Primary Examiner—Patrick Ryan
Assistant Examiner—Susy Tsang-Foster
(74) Attorney, Agent, or Firm—Sughrue Mion, PLLC

(57) ABSTRACT

An electrochemically active material consisting of a $CaCu_5$ structure single-phase hydridable alloy with the formula $MmNi_aMn_bAl_cCo_dCr_e$ in which Mm is a mischmetal containing at least 50 wt % La, where: $5.10 \leq (a+b+c+d+e)$, $d \leq 0.55$, and $0.03 \leq e \leq 0.1$.

13 Claims, No Drawings

HYDRIDABLE ALLOY

CROSS-REFERENCE TO RELATED APPLICATIONS

This application is based on French Patent Application No. 00 10 526 filed Aug. 10, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to an electrochemically active material consisting of a hydridable alloy that can be used in an alkaline electrolyte secondary storage cell negative electrode. It further relates to a method of fabricating the alloy. The invention also relates to an electrode including the active material and to a storage cell containing an electrode whose electrochemically active material is a hydridable alloy according to the invention.

2. Description of the Prior Art

Sealed nickel-metal hydride (Ni—MH) storage cells are aqueous alkaline electrolyte secondary storage cells. The hydrogen reagent is stored in the mass of the hydridable alloy, which can absorb great quantities of hydrogen. The alloy must be able to store and return hydrogen, depending on whether the storage cell is being charged or discharged, at a sufficient speed under normal conditions of operation. It must also have an electrochemical capacity higher than that of cadmium, resist corrosion in potassium hydroxide, and not be toxic.

At present $AB_5$ type hydridable alloys derived from $LaNi_5$ are mostly used. The substance $LaNi_5$ has a solid-gas reversible hydrogen absorption capacity equivalent to 370 mAh/g. However, its plateau pressure, which is of the order of 2 bar, is too high for use in a negative storage cell electrode, for which the plateau pressure must be from 0.01 bar to 1 bar. Also, this alloy has insufficient resistance to corrosion in concentrated potassium hydroxide.

To reduce the cost of $LaNi_5$ type alloys, the lanthanum La is generally replaced with a mischmetal Mm whose typical composition is: $La_{0.25\ to\ 0.35}\ Ce_{0.45\ to\ 0.55}\ Nd_{0.10\ to\ 0.20}\ Pr_{0.03\ to\ 0.07}$. For the same reason, attempts are made to reduce the proportion of certain costly metals, in particular cobalt, in the alloy. For example, U.S. Pat. No. 5,512,385 proposes a hydridable alloy containing little cobalt. The alloy comprises at least two phases and is represented by the general formula Mm $Ni_xM_y$, in which $5.0 \leq x+y \leq 5.5$ and M is at least one element from Al, Mn, Co, Cu, Fe, Cr, Zr, Ti and V. The alloy has the formula $MmNi_aAl_bMn_cCu_dCo_eFe_fCr_g$, for example.

It is generally accepted that the service life of a nickel-metal hydride storage cell is limited by corrosion of the hydridable alloy during cycling. To reduce corrosion, U.S. Pat. No. 4,487,817 proposes an alloy with the formula $AB_mC_n$ in which $4.8 \leq n+m \leq 5.4$. In particular, A can be a mischmetal containing more than 50 wt % of Ce, approximately 25 wt % La and approximately 25 wt % of a mixture of other rare earths. B is at least two elements from Ni, Co, Cu, Fe and Mn, and C is at least one element in a particular atomic proportion chosen from Al (0.05–0.6), Cr (0.05–0.5) and Si (0.05–0.5).

U.S. Pat. No. 5,753,386 proposes an alloy having a long service life in cycling in a wide temperature range. The alloy is represented by the general formula: $A\ Ni_aM_bM'_cT_d$ where A is a mischmetal comprising La (50–70 wt %), Ce (1–30 wt %), Pr (0–10 wt %), Nd (0–10 wt %) and Y (0–10 wt %). M is at least one element from Co, Fe and Cu, M' is Mn and/or Al, and T is at least one element from B, Si, S, Cr, Ga, Ge, Mo, Ru, Rh, Pd, Ag, In, Sn, Sb, Bi, P, V, Nb, Ta and W. In the above formula, the atomic composition is as follows: $3.2 \leq a \leq 4.0$; $0.4 \leq b \leq 1.5$; $0.3 \leq c \leq 0.9$; $0 \leq d \leq 0.2$ and $4.5 \leq a+b+c+d \leq 5.6$. The alloy is fabricated by melting a mixture of the consituents in the above proportions and then cooled rapidly, at a rate of at least 100° C./s, and finally heat treated, preferably at a temperature from 500° C. to 900° C. Initially the additional constituents are uniformly dispersed in the alloy and a fine-grain intergranular phase is precipitated. If the sum (a+b+c+d) is outside the range 4.5–5.6 the quantity of the second phase is increased.

However, some applications require the storage cell to be able to resist high temperatures during long idle periods or periods of permanent overcharging between charging and discharging phases. In this case, the service life of the storage cell will depend on the ability of the hydridable alloy to resist corrosion in storage in a high-concentration aqueous alkaline electrolyte.

The object of the present invention is to propose an electrochemically active material in the form of a hydridable alloy having high resistance to corrosion during cycling and whose corrosion during storage is reduced compared to prior art materials.

SUMMARY OF THE INVENTION

The invention provides an electrochemically active material consisting of a $CaCu_5$ structure single-phase hydridable alloy with the formula $$MmNi_aMn_bAl_cCo_dCr_e$$

in which Mm is a mischmetal containing at least 50 wt % La, where:

$5.10 \leq (a+b+c+d+e)$, $d \leq 0.55$, and $0.03 \leq e \leq 0.1$.

For cost reasons, the atomic proportion of Co must be at most equal to 0.55, i.e. contain an amount of Co less than or equal to 7.5 wt % relative to the alloy. This reduces the resistance of the alloy to decrepitation. Increasing the stoichiometry beyond 5.10 remedies this drawback, but the plateau pressure then increases in an unacceptable proportion for use of the alloy as an electrochemically active material in an electrode. The aforementioned drawbacks are solved by using a mischmetal containing at least 50% La combined with an atomic proportion of Cr such that $0.03 \leq e \leq 0.1$ The invention further provides an electrochemically active material consisting of a $CaCu_5$ structure single-phase hydridable alloy with the formula $$MmNi_aMn_bAl_cCo_dCr_e$$

in which Mm is a mischmetal containing from 50 wt % to 80 wt % La, where:

$3.7 \leq a \leq 4.3$
$0.3 \leq b \leq 0.7$
$0.1 \leq c \leq 0.4$
$d \leq 0.55$
$0.03 \leq e \leq 0.1$
$5.10 \leq (a+b+c+d+e) \leq 5.40$ For values of (a+b+c+d+e) greater than 5.40 the capacity is reduced, the plateau pressure is increased and secondary phases are precipitated that are depleted or free of mischmetal in the $CaCu_5$ structure matrix. The alloy is no longer a single-phase material. To retain sufficient resistance to corrosion during cycling, the following condition preferably applies: $5.15 \leq (a+b+c+d+e) \leq 5.35$.

In accordance with the present invention, Mm is a mischmetal consisting of a mixture of La, Ce, Nd and Pr. It contains from 50 wt % to 80 wt % La, preferably 50 wt % to 70 wt % and even more preferably 60 wt %. The amount of Ce in the mischmetal must not be less than 10 wt % to preserve sufficient resistance to decrepitation.

The atomic proportion of Mn is such that $0.3 \leq b \leq 0.7$ and preferably $0.45 \leq b \leq 0.65$.

The atomic proportion of Al must be greater than or equal to 0.1. With less Al the corrosion resistance of the alloy is no longer sufficient. The atomic proportion of Al is $0.1 \leq c \leq 0.4$ and preferably $0.15 \leq c \leq 0.25$.

In the alloy according to the invention, the atomic proportion of Co is $0.25 \leq d \leq 0.55$, preferably $0.25 \leq d \leq 0.51$, to achieve an acceptable cost, and even more preferably $0.35 \leq d \leq 0.45$.

During previous experiments on this family of alloys, it was observed that an atomic proportion of Cr greater than 0.1 atom of Cr for one atom of Mm led to low capacity per unit mass and slow activation. The atomic proportion of Cr is such that $0.03 \leq e \leq 0.1$ and preferably such that $0.03 \leq e \leq 0.07$.

The method of fabricating an electrochemically active material in accordance with the present invention comprises the following steps:

simultaneously melting the constituents of the hydridable alloy in an oxygen-free atmosphere, rapidly cooling the molten mixture at a cooling rate of at least $10°$ $C.s^{-1}$; and annealing the alloy in an oxygen-free atmosphere at temperatures from 900° C. to 1100° C. The annealing time is preferably less than or equal to 16 hours.

Before producing the electrode, the active material obtained can be subjected to a surface treatment using an acid or basic solution.

Rapid cooling of the molten alloy can be achieved by casting it into the form of a plate in a cooled metal mold, for example, which produces a rate of cooling of the order of $10°$ $C.s^{-1}$. The grinding can be carried out in a ball, roller or blade mill, or in a gas jet (jet milling).

The alloy can equally be obtained by a gaseous atomization process in which the molten alloy is ejected through a nozzle in the form of droplets that cool in contact with an inert gas atmosphere. The alloy is then obtained directly in the form of a powder.

The alloy can also be rapidly cooled using methods for rapid solidification of the melt by quenching on a wheel in an inert atmosphere (the melt spinning process and its derivatives). The wheel is generally made from a metal that is a good conductor of heat, such as a copper alloy. The melt spinning process consists of using gas pressure to spray the melt onto the wheel through a circular orifice or an elongate slot (in which case the method is referred to as planar flow casting). The melt overflow process, also known as strip casting, consists of pouring the melt into an intermediate tank from which it overflows into contact with the wheel. These processes form strips or flakes (if the alloy is brittle) whose thickness is less than or equal to 100 μm and provide cooling rates up to $10^{6°}$ $C.s^{-1}$.

The invention also provides an electrode including an electrochemically active material in the form of the hydridable alloy previously described. The electrode includes a conductive support and a layer containing said active material and a binder. The conductive support can be a two-dimensional support such as a solid or perforated strip, an expanded metal, a grid or a woven material, or a three-dimensional support such as a foam or a felt. The support is covered with a layer containing the electrochemically active material, a binder and usually a conductive material, but also yttrium compounds. The active layer can also include small quantities of additives to facilitate shaping of the electrode, such as a thickener or a texture stabilizer. The electrode can also undergo a surface treatment using an acid or basic solution before or after it is placed in the storage cell.

The invention finally provides a secondary storage cell, in particular a nickel-metal hydride storage cell, comprising a negative electrode containing the hydridable alloy previously described, a positive electrode whose electrochemically active material is a hydroxide which contains nickel, a polymer separator and an alkaline aqueous electrolyte. The positive electrode can be of the sintered type or include a foam support. It can contain a hydroxide based on nickel partly substituted with Co and/or Zn, a cobalt compound in the form of a conductive coating and possibly an yttrium compound such as $Y_2O_3$. The two electrodes are separated by a polyamide or polyolefin separator, possibly treated with acrylic acid or a polysulfone.

Other features and advantages of the present invention will become apparent on reading the following description of embodiments of the invention, given by way of illustrative and non-limiting example.

DETAILED DESCRIPTION OF THE PREFERRED EMBODIMENTS

Production of the Alloys:

EXAMPLES 1 to 3

Hydridable alloys in accordance with the present invention were made with the formula $MmNi_aMn_bAl_cCo_dCr_e$ in which Mm was a mischmetal containing 60 wt % La.

The mischmetal and other components were placed in a crucible and simultaneously melted in an induction furnace containing an oxygen-free atmosphere. The mixture was then rapidly cooled at a rate of $10°$ $C.s^{-1}$ by casting it in the form of 1 cm thick plates in a water-cooled copper mold. The alloys were then annealed for 16 hours in an oxygen-free atmosphere, in a vacuum or in an argon atmosphere. The alloy was finally reduced to powder form by crushing and mechanically grinding the ingots. Only the fraction of powder passing through a 75 μm mesh was retained for performance evaluation. The alloy obtained was analyzed by inductively coupled plasma (ICP) spectroscopy.

Hydridable alloys I, II and III in accordance with the present invention were produced in the method described above with the respective formulas:

$$MmNi_{4.04}Mn_{0.50}Al_{0.20}Co_{0.51}Cr_{0.05} \quad (I)$$

$$MmNi_{4.00}Mn_{0.50}Al_{0.21}Co_{0.40}Cr_{0.05} \quad (II)$$

$$MmNi_{3.99}Mn_{0.31}Al_{0.40}Co_{0.51}Cr_{0.04} \quad (III)$$

Annealing was carried out at 1000° C. for alloys I and II and at 1100° C. for alloy III.

EXAMPLES 4 to 6

Hydridable alloys in accordance with the present invention were made with the formula $MmNi_aMn_bAl_cCo_dCr_e$ in which Mm was a mischmetal containing 60 wt % La, in the same manner as described for examples 1 to 3, except that cooling was effected by gaseous atomization in an argon atmosphere. The rate of cooling was of the order of $10^{+4°}$ C. to $10^{+5°}$ C.s$^{-1}$. The alloys were then annealed for 16 hours in an oxygen-free atmosphere, in a vacuum or in an argon atmosphere. This operation produced a spherical powder. Only the fraction of the powder passing through a 75 μm screen was retained for performance evaluation.

Hydridable alloys IV, V and VI in accordance with the present invention were produced as described above with the respective formulas:

$$MmNi_{3.96}Mn_{0.50}Al_{0.20}Co_{0.51}Cr_{0.05} \quad (IV)$$

$$MmNi_{3.92}Mn_{0.40}Al_{0.30}Co_{0.51}Cr_{0.05} \quad (Va-Vb)$$

$$MmNi_{3.86}Mn_{0.30}Al_{0.39}Co_{0.50}Cr_{0.05} \quad (VI)$$

Annealing was carried out at 1100° C. for alloys IV and Va and at 900° C. for alloys Vb and VI.

EXAMPLE 7

By way of comparison, a hydridable alloy VII was produced with the formula $MmNi_{3.81}Mn_{0.31}Al_{0.39}Co_{0.50}Cr_{0.06}$ in which Mm was a mischmetal containing 60 wt % La, in the same manner as described for examples 1 to 3, except that the cooling was effected by conventional casting in a 5 cm diameter refractory steel ingot mold. The rate of cooling was of the order of 1° C.s$^{-1}$. The alloy was then cooled for 16 hours at 1100° C. in an oxygen-free atmosphere or in an argon atmosphere.

The alloy obtained was not a single-phase material; it consisted of a hexagonal structure $CaCu_5$ type matrix in which the Cr was precipitated in the form of flakes.

EXAMPLES 8 to 11

By way of comparison, hydridable alloys were produced with the formula $MmNi_aMn_bAl_cCo_d$ in which Mm was a mischmetal containing 60 wt % La, in the same manner as described for example 1.

Hydridable alloys VIII, IX, X and XI were produced with the respective formulas:

$$MmNi_{3.80}Mn_{0.59}Al_{0.20}Co_{0.51} \quad (VIII)$$

$$MmNi_{3.97}Mn_{0.61}Al_{0.21}Co_{0.51} \quad (IX)$$

$$MmNi_{3.96}Mn_{0.61}Al_{0.20}Co_{0.51} \quad (X)$$

$$MmNi_{3.99}Mn_{0.31}Al_{0.40}Co_{0.50} \quad (XI)$$

Annealing was carried out at 1000° C. for alloys VIII and IX, 1075° C. for alloy X and 1100° C. for alloy XI.

EXAMPLE 12

By way of comparison, a hydridable alloy XII was produced with the formula $MmNi_{3.84}Mn_{0.61}Al_{0.21}Co_{0.51}$, in which Mm was a mischmetal containing 60 wt % La, in the same manner as described for examples 4 to 6, annealing being carried out at 900° C.

EXAMPLE 13

By way of comparison, a hydridable alloy XIII was produced containing yttrium Y and with the formula $Mm_{0.95}Y_{0.05}Ni_{3.93}Mn_{0.31}Al_{0.39}Co_{0.50}$ in which Mm was a mischmetal containing 60 wt % La, in the same manner as described for examples 1 to 3, annealing being carried out at 1100° C.

Test of Corrosion During Storage (Soak Test):

5 g of hydridable alloy powder was placed in 50 ml of an 8.7N concentration aqueous solution of potassium hydroxide KOH in a polymethylpentene flask. The flask was then filled with nitrogen and sealed with polytetrafluoroethylene (PTFE) tape (to prevent oxidation by the air) and placed for eight days in a both at a thermostatically controlled temperature of 70° C. The flask was continuously stirred during this period.

The aluminum contained in the alloy dissolved in the potassium hydroxide as the alloy corroded. The aluminum concentration of the solution was determined by ICP spectroscopy at the end of the storage period. The rate of corrosion of the alloy was calculated as the ratio of the quantity of aluminum in the solution to the quantity of aluminum initially contained in the 5 g of alloy.

The results of the above test are set out in the table below. In the table, Ts indicates the rate of corrosion during storage expressed as a percentage of dissolved aluminum.

The results show that the rate of corrosion during storage of the alloys that were not in accordance with the invention was from 1.8% to 2.6% whereas that for the alloys in accordance with the present invention was from 1.2% to 1.7%.

Test of Corrosion During Cycling:

The powdered hydridable alloys previously produced were evaluated as electrochemically active materials in an alkaline electrolyte secondary storage cell negative electrode.

The negative electrode consisted of a mixture of 65 wt % hydridable alloy powder, 30 wt % nickel powder conductive agent and 5 wt % PTFE binder. The mixture was compressed onto an expanded nickel conductive support.

The use of a conductive electrode support of a different nature and structure could of course be envisioned. The various constituents of the paste and their relative proportions could be changed. In particular, additives to facilitate forming the electrode could be added in small proportions, such as a thickener or a texture stabilizer.

The electrochemical performance of the alloys was evaluated in open storage cells limited by the negative electrode. The negative electrode was insulated from two nickel positive electrodes with nickel foam supports by a polyolefin separator and a membrane designed to prevent recombination of oxygen at the negative electrode. This electrode assembly was introduced into a polyethylene container and impregnated with the electrolyte, consisting of an 8.7M concentration aqueous solution of KOH, to form an Ni—MH storage cell. Cycling was carried out at room temperature under the following conditions: Activation, 10 cycles:

- charge for 16 hours at 0.1×Ic, where Ic is the theoretical current required to discharge the storage cell in one hour,
- rest for one hour, and
- discharge at 0.2×Ic to a voltage of 0.9 V, followed by fast cycling, after charging for 16 hours at 0.1×Ic:
- discharge at Ic for 48 minutes, which represented 80% of the depth of discharge (DOD), and
- charge at Ic for 52 minutes, which corresponded to an overcharging coefficient of 8%.

After 300 cycles, the rate of corrosion of the alloy during cycling was measured by ICP spectroscopy of the aluminum contained in the two positive electrodes. The aluminum of the alloy corroded during cycling was dissolved in the electrolyte and trapped in the positive electrode [P. Bernard, J. Electrochem. Soc., 145 (1998) 456–458]. The rate of corrosion was calculated as the ratio of the quantity of aluminum inserted into the positive electrodes to the quantity of aluminum initially contained in the alloy of the negative electrode.

The results of the above test are set out in the table below. In the table, C indicates the capacity in mAh per gram of alloy at the end of the activation phase and Tc indicates the rate of corrosion after 300 cycles expressed as a percentage of aluminum in the positive electrode.

The results show that the rate of corrosion during cycling of the alloys in accordance with the present invention had not increased relative to those measured for the alloys that were not in accordance with the invention, and that the high capacities were preserved.

What is claimed is:

1. An electrochemically active material consisting of a $CaCu_5$ structure single-phase hydridable alloy with the formula $$MmNi_aMn_bAl_cCo_dCr_e$$

in which Mm is a mischmetal containing at least 50 wt % La, where:
 $5.10 \leq (a+b+c+d+e)$,
 $d \leq 0.55$,
 $0.03 \leq e \leq 0.1$.

2. The active material claimed in claim 1, wherein Mm is a mischmetal containing 50 wt % to 80 wt % La, where:
 $3.7 \leq a \leq 4.3$
 $0.3 \leq b \leq 0.7$
 $0.1 \leq c \leq 0.4$
 $d \leq 0.55$
 $0.03 \leq e \leq 0.1$
 $5.10 \leq (a+b+c+d+e) \leq 5.40$.

3. The active material claimed in claim 1 wherein Mm is a mischmetal containing 50 wt % to 70 wt % La.

4. The active material claimed in claim 1 wherein $5.15 \leq (a+b+c+d+e) \leq 5.35$.

5. The active material claimed in claim 1 wherein $0.45 \leq b \leq 0.65$.

6. The active material claimed in claim 1 wherein $0.15 \leq c \leq 0.25$.

7. The active material claimed in claim 1 wherein $0.25 \leq d \leq 0.51$.

8. The active material claimed in claim 1 wherein $0.35 \leq d \leq 0.45$.

9. The active material claimed in claim 1 wherein $0.03 \leq e \leq 0.07$.

10. A method of fabricating an electrochemically active material consisting of a $CaCu_5$ structure single-phase hydridable alloy with the formula $$MmNi_aMn_bAl_cCo_dCr_e$$

in which Mm is a mischmetal containing at least 50 wt % La, where:
 $5.10 \leq (a+b+c+d+e)$,
 $d \leq 0.55$,
 $0.03 \leq e \leq 0.1$,
said method including the following steps:

TABLE

| Ref. | Composition | a + b + c + d | Process | Ts | C | Tc |
|---|---|---|---|---|---|---|
| I | $Mm\,Ni_{4.04}\,Mn_{0.50}\,Al_{0.20}\,Co_{0.51}\,Cr_{0.05}$ | 5.30 | RR-1000° C. | 1.3 | 318 | 6.2 |
| II | $Mm\,Ni_{4.00}\,Mn_{0.50}\,Al_{0.21}\,Co_{0.40}\,Cr_{0.05}$ | 5.16 | RR-1000° C. | 1.5 | 317 | 6.7 |
| III | $Mm\,Ni_{3.99}\,Mn_{0.31}\,Al_{0.40}\,Co_{0.51}\,Cr_{0.04}$ | 5.16 | RR-1100° C. | 1.7 | 299 | 3.5 |
| IV | $Mm\,Ni_{3.96}\,Mn_{0.50}\,Al_{0.21}\,Co_{0.51}\,Cr_{0.05}$ | 5.23 | AG-1100° C. | | | |
| Va | $Mm\,Ni_{3.92}\,Mn_{0.40}\,Al_{0.30}\,Co_{0.51}\,Cr_{0.05}$ | 5.18 | AG-1100° C. | | | |
| Vb | $Mm\,Ni_{3.92}\,Mn_{0.40}\,Al_{0.30}\,Co_{0.51}\,Cr_{0.05}$ | 5.18 | AG-900° C. | | | |
| VI | $Mm\,Ni_{3.86}\,Mn_{0.30}\,Al_{0.39}\,Co_{0.50}\,Cr_{0.05}$ | 5.10 | AG-900° C. | 1.2 | 308 | 7.4 |
| VII | $Mm\,Ni_{3.81}\,Mn_{0.31}\,Al_{0.39}\,Co_{0.50}\,Cr_{0.06}$ | 5.07 | CC-1100° C. | 2.2 | 301 | 5.0 |
| VIII | $Mm\,Ni_{3.80}\,Mn_{0.59}\,Al_{0.20}\,Co_{0.51}$ | 5.11 | RR-1000° C. | 2.4 | 324 | 7.2 |
| IX | $Mm\,Ni_{3.97}\,Mn_{0.61}\,Al_{0.21}\,Co_{0.51}$ | 5.30 | RR-1000° C. | 2.6 | 306 | 7.1 |
| X | $Mm\,Ni_{3.96}\,Mn_{0.61}\,Al_{0.20}\,Co_{0.51}$ | 5.28 | RR 1075° C. | 2.3 | 307 | 7.6 |
| XI | $Mm\,Ni_{3.99}\,Mn_{0.31}\,Al_{0.40}\,Co_{0.50}$ | 5.20 | RR-1100° C. | 2.4 | 286 | 1.2 |
| XII | $Mm\,Ni_{3.84}\,Mn_{0.61}\,Al_{0.21}\,Co_{0.51}$ | 5.17 | AG-900° C. | 1.8 | 321 | 8.6 |
| XIII | $Mm_{0.95}\,Y_{0.05}\,Ni_{3.93}\,Mn_{0.31}\,Al_{0.39}\,Co_{0.50}$ | 5.13 | RR-1100° C. | 1.8 | 298 | 4.1 | simultaneously melting the constituents of the hydridable alloy in an oxygen-free atmosphere, rapidly cooling the molten mixture at a cooling rate of at least $10°$ $C.s^{-1}$; and annealing the alloy in an oxygen-free atmosphere at temperatures from $900°$ C. to $1100°$ C.

11. The method claimed in claim 10 wherein the annealing time is less than or equal to 16 hours.

12. An electrode including an electrochemically active material consisting of a $CaCu_5$ structure single-phase hydridable alloy with the formula $$MmNi_aMn_bAl_cCo_dCr_e$$

in which Mm is a mischmetal containing at least 50 wt % La, where:

$5.10 \leq (a+b+c+d+e)$, $d \leq 0.55$, $0.03 \leq e \leq 0.1$, said electrode further including a conductive support and a layer containing said active material and a binder.

13. A secondary storage cell comprising a negative electrode according to claim 12, a positive electrode whose electrochemically active material is a hydroxide which contains nickel, a polymer separator and an alkaline aqueous electrolyte.

* * * * *

UNITED STATES PATENT AND TRADEMARK OFFICE
CERTIFICATE OF CORRECTION

PATENT NO.     : 6,472,102 B2
DATED          : October 29, 2002
INVENTOR(S)    : Bernard Knosp et al.

It is certified that error appears in the above-identified patent and that said Letters Patent is hereby corrected as shown below:

<u>Title page,</u>
Item [73], add the second assignee:

-- Triebacher Auermet Producktionsges M.B.H.
Triebach-Althofen, Austria --

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,472,102 B2  
DATED         : October 29, 2002  
INVENTOR(S)   : Bernard Knosp et al.

It is certified that error appears in the above-identified patent and that said Letters Patent is hereby corrected as shown below:

<u>Title page,</u>
Item [73], Assignee, correct the second assignee to read as follows:
-- Treibacher Auermet Produktionsges m.b.H. --

Signed and Sealed this

Eighteenth Day of May, 2004

JON W. DUDAS
*Acting Director of the United States Patent and Trademark Office*